United States Patent [19]

Jonas et al.

[11] Patent Number: 6,004,483

[45] Date of Patent: Dec. 21, 1999

[54] SCRATCH-RESISTANT CONDUCTIVE COATINGS

[75] Inventors: Friedrich Jonas, Aachen; Klaus Lerch, Krefeld; Wolfgang Fischer, Meerbusch, all of Germany

[73] Assignee: Bayer Aktiengesellschaft, Leverkusen, Germany

[21] Appl. No.: 08/669,168

[22] Filed: Jun. 24, 1996

[30] Foreign Application Priority Data

Jul. 3, 1995 [DE] Germany .............. 195 24 132

[51] Int. Cl.⁶ .............. H01B 1/20; B05D 5/12
[52] U.S. Cl. .............. 252/500; 528/377; 428/926; 427/58
[58] Field of Search .............. 252/500, 518; 528/373, 377, 378; 524/82, 84; 428/926; 427/58

[56] References Cited

U.S. PATENT DOCUMENTS

| | | | |
|---|---|---|---|
| 5,035,926 | 7/1991 | Jonas et al. | 427/393.1 |
| 5,137,799 | 8/1992 | Kaempf et al. | 430/270 |
| 5,286,414 | 2/1994 | Kämpf et al. | 252/500 |
| 5,300,575 | 4/1994 | Jonas et al. | 525/186 |
| 5,447,824 | 9/1995 | Mutsaers et al. | 430/315 |
| 5,462,696 | 10/1995 | McGinniss et al. | 252/500 |
| 5,482,655 | 1/1996 | Vogel et al. | 252/500 |

FOREIGN PATENT DOCUMENTS

| | | |
|---|---|---|
| 003 337 | 8/1979 | European Pat. Off. . |
| 440 957 | 8/1991 | European Pat. Off. . |
| 26 51 507 | 5/1978 | Germany . |
| 42 29 192 | 3/1994 | Germany . |
| 37 06 355 | 9/1998 | Germany . |

*Primary Examiner*—Mark Kopec
*Attorney, Agent, or Firm*—Connolly Bove Lodge & Hutz LLP

[57] ABSTRACT

Mixture of a polythiophene preparation which contains a polythiophene salt polythiophene$^\oplus$ An$^\ominus$ in which the polythiophene contains positively charged and uncharged recurring units of the formula

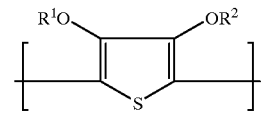

in which $R_1$ and $R_2$ independently of one another stand for hydrogen or a $C_1$–$C_4$ alkyl group or together form an optionally substituted $C_1$–$C_4$ alkylene radical, preferably a methylene radical optionally substituted with alkyl groups, an ethylene-1,2 radical optionally substituted with $C_1$–$C_{12}$ alkyl groups or phenyl groups, a propylene-1,3 radical or a cyclohexylene-1,2 radical, and An$^\ominus$ denotes a polyanion, and coating compositions which are curable by ionising radiation, and the use thereof in order to produce scratch-resistant electrically conductive coatings.

17 Claims, No Drawings

SCRATCH-RESISTANT CONDUCTIVE COATINGS

The invention relates to an adherent, scratch-resistant conductive coating based on polythiophene preparations for non-conducting formed pieces for example of plastics.

EP-A 440 957 discloses utilisation of preparations of polythiophenes which contain polyanions, to produce conductive coatings.

However, it has emerged that the scratch resistance of these coatings is in practice insufficient for some applications.

It has been found that by combining polythiophene preparations with coating compositions which cure by ionizing radiation (such as UV or electron beam) it is possible to achieve improved scratch resistance.

Suitable polythiophene preparations contain polythiophene salts of the form polythiophene$^\oplus$ An$^\ominus$ in which the polythiophene contains positively charged and uncharged recurring units

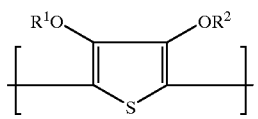

and $R_1$ and $R_2$ independently of one another stand for hydrogen or a $C_1$–$C_4$ alkyl group or together form an optionally substituted $C_1$–$C_4$ alkylene radical, preferably a methylene radical optionally substituted with alkyl groups, an ethylene-1,2 radical optionally substituted with $C_1$–$C_{12}$ alkyl groups or phenyl groups, a propylene-1,3 radical or a cyclohexylene-1,2 radical, and An$^\ominus$ denotes a polyanion.

$R_1$ and $R_2$ are preferably methyl and ethyl groups.

Examples which might be preferably named of the optionally substituted $C_1$–$C_4$ alkylene radicals which $R_1$ and $R_2$ may together form are the alkylene-1,2 radicals which derive from the 1,2-dibromoalkanes, such as are obtainable during bromination of α-olefins, such as ethene, propene-1, hexene-1, octene-1, decene-1, dodecene-1 and styrene; the cyclohexylene-1,2, butylene-2,3,2,3-dimethylbutylene-2,3 and pentylene-2,3 radicals might additionally be named.

Preferred radicals formed by $R_1$ and $R_2$ together are the methylene, ethylene-1,2 and propylene-1,3 radicals, with ethylene-1,2 radical being particularly preferred.

The anions of polymeric carboxylic acids, such as polyacrylic acids, polymethacrylic acids or polymaleic acids and polymeric sulphonic acids, such as polystyrenesulphonic acids and polyvinylsulphonic acids, serve as polyanions. These polycarboxylic and polysulphonic acids may also be copolymers of vinylcarboxylic acids and vinylsulphonic acids with other polymerisable monomers, such as acrylic acid esters and styrene.

The molecular weight $M_n$ of the polyacids which supply the polyanions is preferably 1,000 to 2,000,000, particularly preferably 2,000 to 500,000. The polyacids or alkali metal salts thereof may be obtained commercially, for example polystyrenesulphonic acids and polyacrylic acids, or they may be prepared by known processes (q.v., for example, Houben-Weyl, Methoden der organischen Chemie [Methods of Organic Chemistry], Vol. E 20 Makromolekulare Stoffe [Macromolecular Substances], Part 2, (1987), p. 1141 et seq.).

Mixtures of alkali metal salts or polyacids and corresponding quantities of monoacids may also be utilized in place of the free polyacids required for forming the preparations of polythiophenes and polyanions according to the invention.

The preparations may be true solutions, colloidal solutions or finely particulate dispersions. Their preparation is described in EP-A 0 440 957.

In addition to water, other protic solvents are also considered as the solvent or dispersion medium of the polythiophene preparations, for example lower alcohols such as methanol, ethanol and isopropanol, and mixtures of water with lower alcohols and other water-miscible organic solutions such as acetone.

The polythiophene preparations may contain low molecular weight wetting agents or dispersing agents, for example anionic surfactants such as sodium dodecylsulphate, cationic surfactants such as cetyl trimethylammonium bromide and nonionic surfactants such as addition products of alkylphenol and polyethylene oxide, which are admixed before, during or after polymerization. It is preferred to admix nonionic surfactants before polymerization.

The term "dispersion" equally includes macrodispersions having average particle sizes greater than 100 nm and colloidal dispersions having average particle sizes from molecular size up to molecular agglomerates having average particle sizes not exceeding 100 nm.

Examples of suitable radiation-curable coating compositions are (meth)acryloyl group-containing prepolymers which contain per molecule at least two (meth)acryloyl groups, preferably from two to four (meth)acryloyl groups, and which derive from polyesters, polyethers, polyepoxide compounds, aliphatic polyols, polyurethanes and vinyl polymers. Such (meth)acrylate prepolymers are known and are described, for example, in U.S. Pat. Nos. 2,101,107, 2,413, 973; 2,951,758; 3,066,112; 3,301,743; 3,368,900; 3,380, 831; 3,455,801; 3,469,982; 3,485,732; 3,530,100; 3,551, 246; 3,552,986; 3,628,963; 3,660,145; 3,664,861; 3,689, 610; 3,719,521; 3,732,107; 3,782,961; 3,840,369; 3,888, 830; 4,033,920; 4,081,492; 4,206,025; GB-PS 1 006 587; 1 241 823; 1 241 824; 1 321 372; DE-OS 1 916 499; 2 429 527; 2 534 012; 2 737 406 and 2 853 921.

Preferred (meth)acrylate prepolymers are polyester (meth)acrylates such as are obtained by azeotropic esterification of dicarboxylic acids with di- or higher- functional polyols and (meth)acrylic acid. Examples of common dicarboxylic acids are phthalic acid and adipic acid. Examples of polyols are glycol and polyethylene glycol, trimethylolpropane, glycerol and pentaerythritol. Examples of polyepoxide reaction products are bisphenol-A-bis (glycidyl ether) with (meth)acrylic acid and polyurethane (meth)acrylates, such as are obtained by the addition reaction between hydroxyalkyl (meth)acrylate and aromatic or aliphatic polyisocyanates and optionally further addition reaction with polyols.

Amine-modified polyether acrylates, such as are obtained according to DE-OS 3 706 355 from aliphatic primary amines and (meth)acrylic acid esters of ethoxylated or propoxylated polyols, may furthermore be utilized as prepolymers which contain (meth)acryloyl groups.

In order to produce thin layers having a thickness of less than 4 μm, cationically curing lacquer systems which are activatable by UV radiation, for example based on epoxide or vinyl ether, may also be utilized because it is possible with these systems to dispense with curing under inert gas, even when layer thicknesses are small.

Suitable systems are described, for example, in J. V. Crivello, J. L. Lee and D. A. Coulon, New Monomers for Cationic UV Curing, Radiation Curing VI, Conference Proceedings (Sep. 20 to 23, 1982) Chicago, Ill., and are marketed, for example, by Union Carbide under the name Cyracure®.

The top coat binders according to the invention contain as normal auxiliary substances reactive radiation-curable thinners or mixtures thereof. In addition to their function as diluents for the prepolymer, these products also serve to vary the mechanical properties, for example, the hardness, of the resulting film. Examples of such reactive radiation-curable thinners are acrylic or methacrylic acid esters, preferably of monohydric to trihydric alcohols or of the oxalkylation products thereof, in particular of the oxethylation products thereof. In the case of the oxalkylation products an average of from 0.8 to 12 mole alkylene oxide, such as ethylene oxide or propylene oxide, preferably ethylene oxide, is added to 1 hydroxyl group of the respective mono- or polyhydric alcohol.

The acrylates of dihydric and trihydric alcohols or of the oxethylation products thereof are particularly preferred as reactive radiation-curable thinners.

The following examples might be named: ethylene glycol di(meth)acrylate, di(meth)acrylates of diethylene glycol, triethylene glycol, tetraethylene glycol and pentaethylene glycol; propylene glycol di(meth)acrylate; di(meth)acrylates of di-to pentapropylene glycol; neopentyl di(meth)acrylate; butanediol-4,4-di(meth)acrylate; hexanediol-1,6-di(meth) acrylate; trimethylolpropane tri(meth)acrylate, triacrylates of oxethylated trimethylolpropane having a degree of oxethylation of from 2.5 to 4 according to DE-PS 2 651 507. Reactive radiationcurable thinner contents are within the range 0 to 83 wt-%, calculated on the total quantity of polymerizable constituents. The paint recipes according to the invention contain amine-modified polyether acrylates as accelerators which are essential constituents. These are obtained by the addition of secondary aliphatic amines to reactive thinners which contain per molecule at least two (meth)acryloyl groups. Suitable compounds are described in DE 2 346 424.

The binder may contain as auxiliary substances from 0.001 to 0.2 wt-%, calculated on radiation-curable components, of conventional polymerisation inhibitors or antioxidants. Examples of such compounds are: 4,4'-bis(2, 6-di.-tert.-butylphenol), 1,3,5-trimethyl-2,4,6-tris(3,5-di-tert.-butyl-4-hydroxybenzyl) benzene, 4,4'-butylidene-bis (6-tert.-butyl-m-cresol), 3,5-di-tert.-butyl4-hydroxybenzylphosphonic acid diethyl ester, N,N'-bis(β-naphthyl)-p-phenylenediamine, N,N'-bis(1-methylheptyl)-p-phenylenediamine, phenyl-β-naphthylamine, 4,4'-bis(α, α-dimethylbenzyl) diphenylamine, 1,3,5-tris(3,5-di-tert.-butyl-4-hydroxyhydrocinnamoyl)-hexahydro-s-triazine, hydroquinone, p-benzoquinone, hydroquinone monomethylether, 2,5-di-tert.-butylquinone, toluhydroquinone, p-tert.-butylcatechol, 3-methylcatechol, 4-ethylcatechol, chloranil, naphthoquinone, copper naphthenate, copper octoate, Cu(I)Cl/triphenyl phosphite, Cu(I)Cl/trimethyl phosphite, Cu(I)Cl/trichloroethyl phosphite, Cu(I)Cl/tripropyl phosphite, p-nitrosodimethyl aniline.

There may furthermore be present in the binder as auxiliary substances from 0.1 to 5 wt-%, calculated on radiation-curable components, for example, anti- sedimentation agents such as dimethyl stearylamine, stearic acid, metal stearates, monovalent to trivalent metals, stearyl alcohol, the corresponding oleyl derivatives or surface-active agents such as highly dispersed silica and lubricants such as silicones.

The ionizing radiation-curing binders are preferably utilized in the form of aqueous dispersions or solutions with the polythiophene preparations. Corresponding preparations of aqueous ionizing radiation-curing binders are described, for example, in EP 3337 and in Farbe und Lack 98 (1992) 165–170.

The mixtures according to the invention of polythiophene preparation and ionizing radiation-curable binder contain between 0.5 and 90 wt-%, preferably between 5 and 60 wt-%, solids. Calculated on the polythiophene preparation (100 wt-%) contained in the solids, the mixtures contain from 10 to 10,000 wt-%, preferably from 50 to 2,000 wt-%, ionizing radiation-curable binder.

The mixtures according to the invention may be prepared by mixing the polythiophene preparation and the ionizing radiation-curable binder. It is of proven value first to disperse the ionizing radiation-curable binder in water and then to mix with the polythiophene preparation, with stirring. The ionizing radiation-curable binder can, however, also be dispersed or dissolved directly in the polythiophene preparation.

There may be added to the solutions according to the invention water-miscible solvents, for example alcohols such as methanol, ethanol, propanol, isopropanol, glycols, ketones such as acetone, methyl ethyl ketone, amides such as N,N-dimethyl formamide, N,N-dimethyl acetamide, N-methyl pyrrolidone.

The mixtures according to the invention may be applied by known techniques, for example by printing such as gravure printing, flexographic printing, screen printing, or by knife application, roll application, curtain coating.

The thickness of the coating after solvent evaporation is from 0.5 to 500 µm, preferably from 3 to 100 µm, depending on the surface resistance required.

The adjustable surface resistances of the coatings range from $10^{16}$ to 0.1 Ω/□, preferably from $10^8$ to 100 Ω/□.

The solvent can be removed after application of the solutions by evaporation at room temperature. However, it is more advantageous to remove the solvents at elevated temperatures, for example at temperatures of up to 150° C., preferably from 40 to 100° C., in order to achieve higher processing speeds.

The following might be named as substrates which can be coated in conductive manner according to the invention: formed bodies and sheets of plastics, for example polyolefins such as polyethylene, polypropylene, polyesters such as polyethylene terephthalate, polyethylene naphthalate, polystyrene, polycarbonate, ABS, polyacrylates, polyacrylonitrile, cellulose derivatives such as cellulose acetate, polyamides, polyvinyl chloride, optionally glass fibre-reinforced epoxy plastics or copolymers or blends thereof. Inorganic formed bodies, for example of glass or ceramic, such as aluminium oxide ceramic or silicon nitride ceramic, may furthermore be coated in conductive manner.

Before coating with the conductive layer, the hydrophobic plastics support is provided optionally with one or more substrate layers in order to improve the adhesion of layers which are subsequently applied. Suitable substrate layers for polyethylene terephthalate supports are known from, for example, U.S. Pat. Nos. 3,397,988, 3,649,336, 4,123,278, 4,478,907, GB 1 234 755 and Research Disclosure, July 1967, page 6. Particularly suitable substrate layers are of vinylidene polymers with copolymerized, ethylenically unsaturated hydrophilic monomers, preferably itaconic acid units (U.S. Pat. No. 3,649,336).

The preparation of the polythiophene dispersions or solutions in accordance with EP-OS 440 957 affords products in which the polymerized thiophene content is from 5 to 50 wt-%, calculated on total solids. There may during the preparation of these polythiophene dispersions be added additionally up to 90 wt-%, calculated on total solids, of other polymer latices or polymer dispersions exhibiting acid groups (salts) such as $-SO_3-$, $-COO-$, phenolate or $-PO_3^{2-}$. The acid group content is preferably greater than 2 wt-% in order to ensure sufficient stability in the dispersion or solution.

Polymers suitable for this purpose are described, for example, in DE-A 2 541 230, DE-A 2 541 274, DE-A 2 835 856, EP-A 0 014 921, EP-A 0 069 671, EP-A 0 130 115, U.S. Pat. No. 4,291,113. The polymer dispersions or latices may contain linear, branched-chain or cross-linked polymers. The cross-linked polymers having a high acid group content are swellable in water and may be utilised in the form known as microgels.

Such microgels are described, for example, in U.S. Pat. No. 4,301,240, U.S. Pat. No. 4,677,050 and U.S. Pat. No. 4,147,550.

Curing is by means of ionizing radiation, optionally under inert gas, for example by electron beam. Although it is possible to cure with a radiation dose of approximately 0.1 to 200 kGy, it is preferred for economic reasons to use coating equipment which operates in continuous manner with radiation sources which exhibit a beam potential of from 100 to 500 kilo Volt (kV), corresponding to a radiation dose of from 10 to 500 kGy. The distance between the electron beam source and the coating to be cured is normally from 10 to 20 cm. If the top coat is cured using UV radiation the top coat binders must be provided additionally in known manner with photoinitiators and optionally photosensitisers.

The photoinitiators and photosensitisers to be used are known per se, and their selection is not provided by the invention. Their use is to a large degree confined to the expedient use of UV radiation, however in principle other ionizing radiation types may also be used. Examples of usable photoinitiators and photosensitisers are benzophenone, acetophenone, benzoin and methyl, ethyl, isopropyl, butyl or isobutyl ethers of benzoin, α-hydroxy or α-aminoarylketones and benzilketals. These substances are generally added in concentrations of from 0.1 to 7.5 wt-%, calculated on polymerizable constituents.

The coatings according to the invention are distinguished by high transparency and scratch resistance. The coatings are utilized for imparting to plastics an antistatic and/or electrically conductive finish. The coated plastics attract markedly less dust and may be utilized, for example, in places where there is an explosion risk. The plastics or glasses coated according to the invention are furthermore suitable as an electromagnetic radiation shield.

EXAMPLE

Preparation of the 3,4-polyethylene dioxythiophene solution 20 g free polystyrenesulphonic acid (molecular weight $\overline{M}_n$ approx. 40,000), 13.0 g potassium peroxydisulphate and 50 mg iron(III) sulphate are introduced, with stirring, in 2,000 ml water. 5.6 g 3,4-ethylene dioxythiophene are added, with stirring. The solution is stirred at room temperature for 24 hours. 100 g anion exchanger (Lewatit® MP 62, Bayer AG) and 100 g cation exchanger (Lewatit® S 100, Bayer AG), both moist with water, are then added and stirred for 8 hours.

The ion exchangers are removed by filtration. A solution having an approximately 1.2 wt-% solids content is obtained which is ready for use.

Coating:

10 g of the polythiophene preparation having a 1.2 wt-% solids content and 2 g of a 50% aqueous dispersion of a UV-curable lacquer (Bayhydrol® 850, Bayer AG) containing, calculated on UV-curable binder, 2.5 wt-% Darocure® 1116 (Ciba Geigy) are mixed, with stirring. The homogeneous mixture is applied to a) glass plates
b) polycarbonate sheets respectively, in a wet film thickness of 60 and 100 μm, corresponding to a dry film thickness of approximately 5.6 and 10 μm, using a hand-operated blade. The solvent is evaporated in the atmosphere over the course of two hours, and the coating is then cured by irradiation with UV radiation. Clear layers having the following properties are obtained:

| Support material | Layer thickness [μm] | Pencil Hardness | Surface resistance [Ω/□] |
|---|---|---|---|
| Glass | 5.6 | >4 H | $2.5 * 10^4$ |
| Glass | 10 | >4 H | $1 * 10^4$ |
| Polycarbonate | 5.6 | >4 H | $6 * 10^4$ |
| Polycarbonate | 10 | >4 H | $5 * 10^3$ |

We claim:

1. Mixture of a polythiophene preparation which contains a polythiophene salt polythiophene$^\oplus$ An$^\ominus$ in which the polythiophene$^\oplus$ of the polythiophene salt contains positively charged and uncharged recurring units of the formula

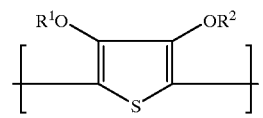

in which

R$_1$ and R$_2$ independently of one another stand for hydrogen or a C$_1$–C$_4$ alkyl group or together form an optionally substituted C$_1$–C$_4$ alkylene radical, and An$^\ominus$ denotes a polyanion, and a coating composition which contains a (meth)acryloyl group-containing prepolymer which contains per molecule at least two (meth)acryloyl groups and which is curable by ionizing radiation.

2. A mixture according to claim 1, wherein said mixture contains water as a solvent.

3. A method of using the mixtures according to claim 1, wherein said mixtures are applied to a surface of a support material in order to produce a scratch-resistant electrically conductive coating on said support material.

4. A mixture according to claim 1, wherein R$_1$ and R$_2$ together form a methylene radical optionally substituted with alkyl groups, an ethylene-1,2 radical optionally substituted with C$_1$–C$_{12}$ alkyl groups or phenyl groups, a propylene-1,3 radical or a cyclohexylene-1,2 radical.

5. A method according to claim 3, wherein said support material is plastic or glass.

6. A scratch-resistant conductive coating prepared from the mixture of claim 1.

7. A mixture according to claim 1, wherein the polythiophene preparation is a solution of said polythiophene salt in a solvent.

8. A mixture according to claim 1, wherein the polythiophene preparation is a colloidal solution containing said polythiophene salt and a solvent.

9. A mixture according to claim 1, wherein the polythiophene preparation is a dispersion of said polythiophene salt in a dispersion medium.

10. A mixture according to claim 7, wherein said solvent is water.

11. A mixture according to claim 8, wherein said solvent is water.

12. A mixture according to claim 9, wherein said dispersion medium is water.

13. A mixture according to claim 7, wherein said solvent consists of water and another protic solvent.

14. A mixture according to claim 8, wherein said solvent consists of water and another protic solvent.

15. A mixture according to claim 9, wherein said dispersion medium consists of water and another protic solvent.

16. A scratch-resistant conductive coating prepared by applying the mixture of claim 7 to a surface of a support material as a thin layer of said mixture and then evaporating said solvent.

17. A scratch-resistant conductive coating according to claim 16, wherein said conductive coating has a thickness of from 0.5 to 500 $\mu$m.

* * * * *